(12) United States Patent
Wei

(10) Patent No.: US 10,564,329 B2
(45) Date of Patent: Feb. 18, 2020

(54) SHADING UNIT AND LENS MODULE USING SAME

(71) Applicant: Chuandong Wei, Shenzhen (CN)

(72) Inventor: Chuandong Wei, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 15/677,082

(22) Filed: Aug. 15, 2017

(65) Prior Publication Data

US 2018/0299593 A1 Oct. 18, 2018

(30) Foreign Application Priority Data

Apr. 15, 2017 (CN) .................... 2017 2 0399481 U

(51) Int. Cl.
*G02B 5/00* (2006.01)
*G02B 13/00* (2006.01)
*G02B 26/02* (2006.01)
*G02B 7/02* (2006.01)

(52) U.S. Cl.
CPC ............ *G02B 5/003* (2013.01); *G02B 5/005* (2013.01); *G02B 7/021* (2013.01); *G02B 13/0055* (2013.01); *G02B 26/02* (2013.01)

(58) Field of Classification Search
CPC .......... G02B 5/003; G02B 5/005; G02B 5/22; G02B 5/26; G02B 7/021; G02B 9/08; G02B 13/0055; G02B 26/02; G02B 27/0018; G02B 27/58

See application file for complete search history.

(56) References Cited

U.S. PATENT DOCUMENTS

| | | | |
|---|---|---|---|
| 2004/0120046 A1* | 6/2004 | Shirie | G02B 13/001 359/611 |
| 2006/0227834 A1* | 10/2006 | Yoshikawa | G02B 1/118 372/50.11 |
| 2017/0108627 A1* | 4/2017 | Chou | G02B 5/003 |
| 2018/0039047 A1* | 2/2018 | Lin | G02B 9/04 |
| 2018/0239109 A1* | 8/2018 | Chou | G02B 13/002 |
| 2018/0341048 A1* | 11/2018 | Chou | G02B 5/00 |
| 2019/0041608 A1* | 2/2019 | Chou | G02B 13/006 |

\* cited by examiner

*Primary Examiner* — Jordan M Schwartz
(74) *Attorney, Agent, or Firm* — IPro, PLLC; Na Xu

(57) ABSTRACT

The present disclosure provides a shading unit. The shading unit includes an anti-dazzling screen connected and integrated with a substrate; a first aperture hole formed in the substrate through and along a thickness direction; a shading board closer to an in-light side of the first aperture hole than an out-light side; and a second aperture hole formed in the anti-dazzling screen through and along the thickness direction. The second aperture hole is communicated with the first aperture hole. A projection of the second aperture hole is located in a projection of the first aperture hole, a thickness of the anti-dazzling screen ranges between 0.01 mm to 0.05 mm. Further, the present disclosure provides a lens module having the shading unit disclosed above.

8 Claims, 1 Drawing Sheet

SHADING UNIT AND LENS MODULE USING SAME

FIELD OF THE PRESENT DISCLOSURE

The present disclosure relates to imaging technologies, especially to a shading unit and a lens module using the shading unit.

DESCRIPTION OF RELATED ART

A lens module includes a lens and a shading unit. The shading unit is kept out of the edge of the lens to ensure that outside light can enter from the part that is close to optical axis.

Among the related technology, a shading unit is made through machining process technique. The shading unit is very thick and an internal face of an aperture hole of this shading unit generally is plane. When thicker the shading unit is, the larger the area of the plane is. In this way when light passes through the aperture, a lot of light will radiate in the plane and reflect to the portion of the lens close to optical axis through the plane along certain direction to make lens module to produce more stray light.

Therefore it is necessary to provide an improved shading unit and a lens module for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
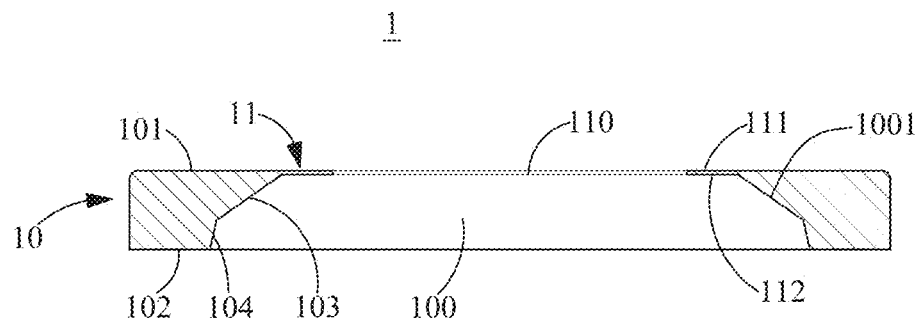
FIG. 1 is an illustrative cross-sectional view of a shading unit in accordance with an exemplary embodiment of the present disclosure.
Figure 2:
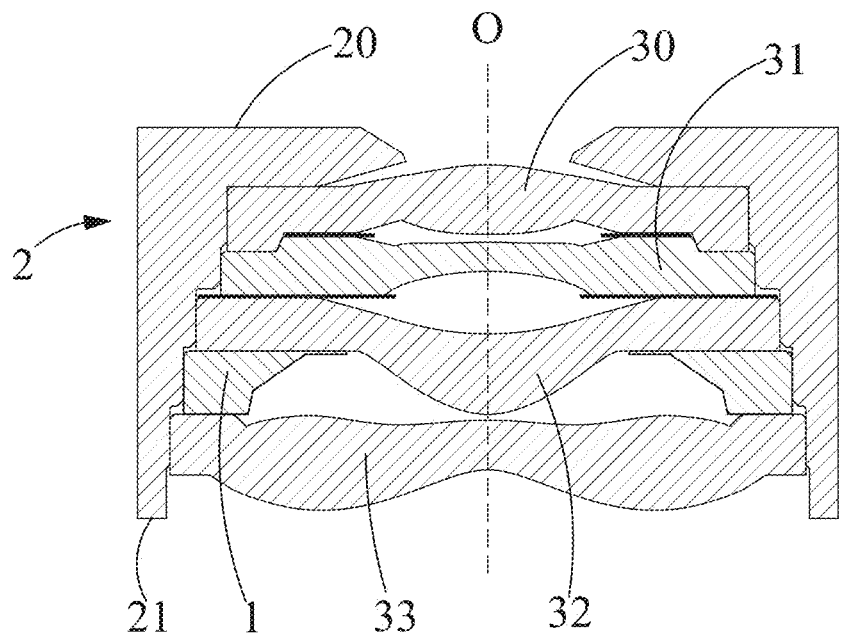
FIG. 2 is an illustrative cross-sectional view of a lens module using the shading unit in FIG. 1.

Shown as FIGS. 1 and 2, A lens module includes a lens barrel 2 and lens. A shading unit 1 and the lens are set in the lens barrel 2. The shading unit 1 can absorb the stray light generated from light illuminating lens to improve the imaging quality of camera.

The shading unit 1 includes a substrate 10 and an anti-dazzling screen 11 integrated with the substrate 10. Through integrating the substrate 10 with the anti-dazzling screen 11, it can guarantee the strength of the structure of the whole shading unit 1. Specifically, a first aperture hole 100 is formed in the substrate 10 through and along the direction of its thickness. The anti-dazzling screen 11 is closer to an in-light side of the first aperture hole 100 comparing with an out-light side of the first aperture hole 100. A second aperture hole 110 is formed in the anti-dazzling screen 11 through and along the direction of its own thickness. The second aperture hole 110 is communicated with the first aperture hole 100 to let light pass through.

A projection obtained along the direction of penetrating of light, the frontal plane of projection of a second aperture hole 110 is located in the plane of projection of the first aperture hole 100. Optionally, the hole of the whole shading unit letting light penetrate is a stepped hole. The stepped hole is formed by the first aperture hole 100 and the second aperture hole 110. The internal face is not regular face. In this way, when the light illuminates the irregular face, the irregular face can reflect the light that comes in for many times to change the reflection angle of light. It can avoid that light reflects into the portion of the lens close to optical axis along a certain direction and lead the situation that lens module produces more stray light easily. Of course, it can be inclined surface or curved surface.

In addition, the anti-dazzling screen 11 has a first shading surface 111 and a second shading surface 112 set oppositely along the direction of its own thickness. Along the direction of the thickness of the anti-dazzling screen 11, the thickness between the first shading surface 111 and the second shading surface 112 falls between 0.01 mm to 0.05 mm. It can be seen that the area of the internal surface of the second aperture hole 110 is very small. In this way, when light comes into the second aperture hole 110, it is hard to illuminate in the internal face of the second aperture hole 110 to reduce the probability of the reflected light of the internal face of the second aperture hole 110 and the generation of stray light.

Preferably, the axis of the first aperture hole 100, the axis of the second aperture hole 110 and the optical axis of the lens of lens module are co-linear with each other to ensure that light can penetrate from all lenses close to the portion of the optical axis. It needs to state when several lenses are set in the lens module, the shading unit 1 can be set between any two adjacent lenses.

Among one embodiment of the present disclosure, the above substrate 10 has a first supporting surface 101 and a second supporting surface 102 set oppositely along the direction of its own thickness. However, the first shading surface 111 extends from the first supporting surface 101 to the direction of the axis of the first aperture hole 100. The first aperture hole 100 is enclosed and formed by one internal face 1001. The second supporting surface 102 and the second shading surface 112 are connected through the internal face 1001 of the first aperture hole 100. This design makes light to penetrate the second aperture hole 110 and the first aperture hole 100 one by one. As the distance between all opposite points on the first shading surface 111 and the second shading surface 112 of the anti-dazzling screen falls between 0.01 mm to 0.05 mm, the area of the internal face of the second aperture hole 110 is very small. When light comes into the second aperture hole 110, it is very hard to illuminate in the internal face of the second aperture hole 110, so it lower the probability of the reflected light of the internal face of the second aperture hole 110.

As the shading unit 1 is applied between two lenses generally. In order to ensure that the shading unit 1 can be supported stably between these two lenses and light can penetrate from the portion that lens is close to optical axis. Among one embodiment of the present disclosure, the first supporting surface 101 and the second supporting surface 102 of the substrate 10 can be designed as plane. Further, the first shading surface 111 and the second shading surface 112 of the anti-dazzling screen can be designed as plane. Among which, the first supporting surface 101 of the substrate 10 is parallel to the supporting surface 102. The first shading surface 111 of the anti-dazzling screen 11 is parallel to the second shading surface 112. Further, the first supporting surface 101 and the first shading surface 111 are vertical with the direction of optical axis. The first supporting surface 101 and the first shading surface 111 are the same horizontal plane.

It is worth stating that the first supporting surface 101 and the second supporting surface 102 can be plane and the face of other shapes as well. It can be decided according to the specific situation. For example, when the face on the lens contacting the first supporting surface 101 and the second supporting surface 102 are cambered surface, the first supporting surface 101 and the second supporting surface 102 can be cambered surface matching it. In a similar way, the first shading surface 111 and the second shading surface 112 can be plane and the face of other shapes. It can be decided according to the specific situation. In addition, the first supporting surface 101 is not definitely parallel to the second supporting surface 102 mutually. The first shading surface 111 is not definitely parallel to the second shading surface 112 mutually.

The internal face 1001 includes a first sub-plane 103 and a second sub-plane 104 set along the direction of the thickness of the substrate 10. One side of the first sub-plane 103 is connected with the second shading surface 112. The other side of the sub-plane 103 inclines to the direction of axis away from the first aperture hole 100 and is connected with one side of the second sub-plane 104. The other side of the sub-plane 104 inclines to the direction of the axis away from the first aperture hole 100 and is connected with the second supporting surface 102. Namely, the internal face of the first aperture hole 100 is irregular face. When light illuminates on the internal face of the first aperture hole 100, it can reflect mutually through the first sub-plane 103, the second sub-plane 104 and the second shading surface 112 to change reflection angle of light to avoid that light reflects to portion of the lens close to optical axis along a certain direction. It leads that lens module generates more stray light. Among one embodiment of the present disclosure, the first shading surface 111 is the surface of the anti-dazzling screen 11 facing to direction of coming of light.

Among one embodiment of the present disclosure, the shading unit 1 is the metal shading unit made by adopting metal material to improve the strength of its own structure. Specifically, the substrate 10 and the anti-dazzling screen 11 become one integrated structure through die-casting technique. Namely, the metal shading unit 1 can be formed by adopting die-casting technique. Among which, the metal shading unit 1 made through this die-casting technique can manufacture relatively thin anti-dazzling screen 11 comparing with the existing machining process while ensuring the strength of the structure of the metal shading unit 1.

Optionally, the shading unit 1 is the plastic shading unit 1 made by adopting plastic material. Specifically, the substrate 10 and the anti-dazzling screen 11 become one integrated structure through injection molding process. Namely, the shading unit 1 can be formed by adopting injection molding process. The processing way is simple and the processing cost is low.

Based on the above structure, the present disclosure also provides one kind of lens module, including lens barrel 2, the shading unit 1 and lens set in the lens barrel 2 and lens. Among which, the shading unit 1 is the shading unit 1 of one of the above embodiments.

Specifically, shown as FIG. 2, the shading unit 1 and lens are arranged one by one along the extension direction of optical axis. Among which, the quantity of the lens is multiple that are the first lens 30, the second lens 31, the third lens 32 and the fourth lens 33 arranged one by one along the direction of coming of light. The shading unit 1 is set between the third lens 32 and the fourth lens 33. Of course, the shading unit 1 can be set between any adjacent two lenses. Shown as FIG. 2, in view of the specific structure of the third lens 32, the shading unit 1 set here can ensure the appropriate gap left between the third lens 32 and the fourth lens 33. In the embodiment shown as FIG. 2, the shading unit is set between the first lens 30 and the second lens 31, the second lens 31 and the third lens 32. But in view of the space to the lens barrel 2, the first lens 30 is set intervally with the second lens 31 and the second lens 31 and the third lens 32 are set intervally. The specific structure of the shading unit set here can be different from the shading unit 1 between the third lens 32 and the fourth lens 33. Specifically, shown as FIG. 2, only one anti-dazzling screen can be set between the first lens 30 and the second lens 31 and the second lens 31 and the third lens 32.

It needs to state that the shading unit can be set as multiple in other embodiments. All shading units can be set between any two adjacent lenses, respectively.

It needs to state that the shading unit can be set between the first lens 30 and the second lens 31 or the second lens 31 and the third lens 32 in other embodiment. The present disclosure does not define it and the quantity of lens either.

Besides, the lens barrel 2 works as the supporting body of supporting all lenses and protects all lenses on the other side. For example, the lens barrel 2 has the first surface 20 and the second surface 21 arranged along the extension direction of the optical axis O. All lenses are located in the space limited by the first surface 20 and the second surface 21.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module including:
a lens barrel;
a shading unit accommodated in the lens barrel;
a lens or a plurality of lenses supported by the lens barrel;
the shading unit including:
an opaque screen connected and integrated with a substrate;
a first aperture hole formed in the substrate through and along a thickness direction;
the opaque screen closer to an in-light side of the first aperture hole than an out-light side;
a second aperture hole formed in the opaque screen through and along the thickness direction, the second aperture hole being communicated with the first aperture hole; wherein
a projection of the second aperture hole is located in a projection of the first aperture hole, a thickness of the opaque screen ranges between 0.01 mm to 0.05 mm;
the opaque screen has a first shading surface and a second shading surface opposite to the first shading surface, the first shading surface is closer to the in-light side than the second shading surface, the first shading surface is parallel to the second shading surface, the substrate has a first supporting surface and a second supporting surface opposite to the first supporting surface, the first supporting surface is the closest surface of the substrate to the in-light side and is closer to the in-light side than the second supporting surface, the first supporting surface and the first shading surface are in the same plane being a plane perpendicular to the thickness direction.

2. The lens module as described in claim 1, including a central part used for imaging and a peripheral portion extending around the central part; a projection of the opaque screen along the optical axis is located in the peripheral portion.

3. The lens module as described in claim 1, wherein the lens or plurality of lenses includes a first lens, a second lens, a third lens and a fourth lens arranged one by one along the optical axis, and the shading unit is arranged between the third lens and the fourth lens.

4. The lens module as described in claim 1, wherein the first shading surface extends from the first supporting surface to the direction of the axis of the first aperture hole; the first aperture hole is enclosed and formed by a first internal face; and the second supporting surface is connected with the second shading surface through the internal face of the first aperture hole.

5. The lens module as described in claim 4, wherein the first supporting surface is parallel to the second supporting surface.

6. The lens module as described in claim 1, wherein the shading unit is circular in shape.

7. The lens module as described in claim 1, wherein the shading unit is a metal shading unit, wherein the substrate and the opaque screen are integrally formed.

8. The lens module as described in claim 1, wherein the shading unit is a plastic shading unit, wherein the substrate and the opaque screen become one integrated structure through die-casting technique.

* * * * *